Jan. 5, 1954 R. J. STRAWINSKI 2,665,237
PROSPECTING
Filed May 8, 1950 4 Sheets-Sheet 1

INVENTOR.
RAYMOND J. STRAWINSKI
BY
ATTORNEYS

Jan. 5, 1954 R. J. STRAWINSKI 2,665,237
PROSPECTING
Filed May 8, 1950 4 Sheets-Sheet 4

INVENTOR.
RAYMOND J. STRAWINSKI
BY
ATTORNEYS

Patented Jan. 5, 1954

2,665,237

UNITED STATES PATENT OFFICE 2,665,237

PROSPECTING

Raymond J. Strawinski, Long Beach, Calif., assignor to Texaco Development Corporation, New York, N. Y., a corporation of Delaware Application May 8, 1950, Serial No. 160,634

6 Claims. (Cl. 195—103.5)

This invention relates to prospecting for subterranean deposits such as petroleum, gas, and other deposits in the surface of the earth.

Many methods have been proposed in prospecting for petroleum and gas in subterranean deposits but none to date have proven successful or capable of producing reproducible data. One method has been based on the theory that gases, hydrocarbon in character, in subterranean deposits gradually escape and diffuse upwardly into the surface soil. Thus, the detection and measurement of the gas content or related characteristics of such soils may serve as an indication of the presence of petroleum or gas deposits under the surface.

In practically all such methods, it is proposed to gather soil samples and thereafter subject them to some type of processing to produce some type of qualitative indication as to the presence or absence of hydrocarbons. In one method, it is proposed to determine the presence of products of hydrocarbon-consuming bacteria and hydrocarbons as by colorimetric methods. Another method involves a study of the oxidation-reduction potential of soil samples. In another method, uniform soil samples are prepared and planted throughout an area of the earth's surface. The samples are inoculated with hydrocarbon-consuming bacteria and examined after a period of propagation to determine the extent of growth of the bacteria.

In another method, soil samples are placed in a sealed chamber with a gas mixture of ethane, propane or butane, and air or oxygen. The pressure changes due to apparent consumption of the hydrocarbon gas are noted and the residual gas in the chamber may be analyzed. Purportedly, the information obtained thereby is of value in determining the presence or absence of petroleum.

So far as is known, none of the above methods have proven successful. This is believed to be due to the methods of sampling as well as the methods of analyzing the soil samples which are such as to disregard a number of variable factors effecting the results as hereinafter explained.

One object of the present invention is to provide a novel method of prospecting wherein soil samples from a selected section of the earth's surface can be collected and processed to determine with reasonable assurance the presence or absence of petroleum or gas deposit indications.

Another object of the invention is to provide a novel method of soil sampling wherein samples of uniform character leading to accurate and reproducible determinations are secured.

Still another object of the invention is the provision of novel methods of analyses on both qualitative and quantitative bases of such soil samples and their abilities to react to selected gas mixtures.

Further objects and advantages of the invention will appear from the following description and claims taken in connection with the attached drawings wherein:

Figs. 1 to 3, inclusive, illustrate reactors in various stages of the analytical procedure.

Figures 1, 2, 3:
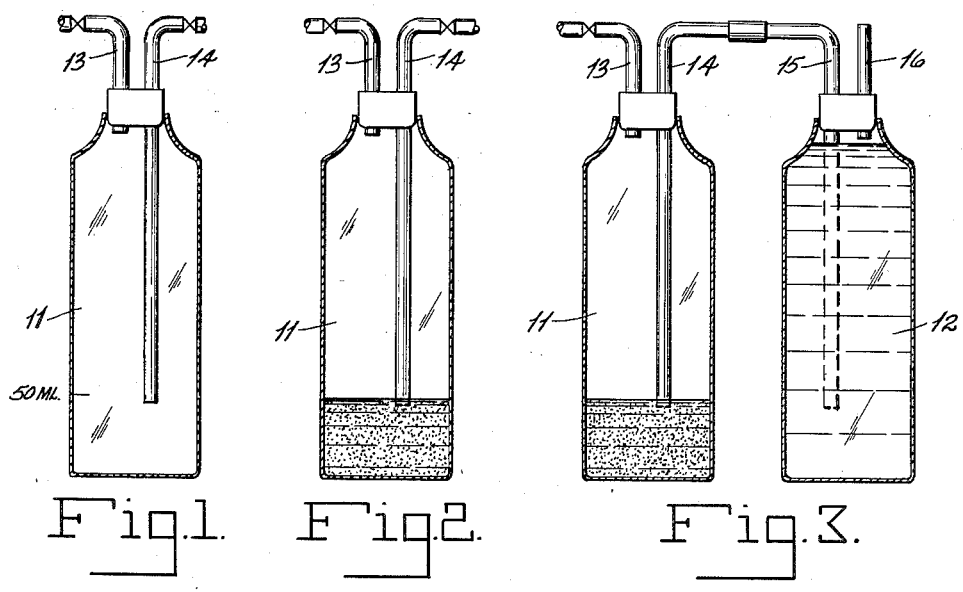

In brief, the present invention is directed to a method of prospecting by the collection and processing of soil samples wherein accurate representative samples are collected and processed under substantially standard conditions with all variables controlled, and the growth of the hydrocarbon-consuming microorganisms or other microorganisms, the presence of which it is desired to determine, is under optimum conditions and, therefore, encouraged so that even small numbers thereof that would otherwise be missed can be determined. The relative determination of such microorganisms is accomplished by determination of the amount of consumption of a gas mixture thereby, the rate of such consumption or reaction, and changes in the composition of the gas.

More specifically, the invention contemplates improved methods of soil sampling, preferably by way of a wet mix, and improved methods of analysis wherein the time ordinarily required for such analyses can be materially reduced.

The method of the present invention can be readily distinguished from the prior art including Patent No. 2,349,472 to Taggart issued May 23, 1944. In the Taggart patent, individual soil samples with their varying moisture content and varying nutrient content, assuming some nutrient is present, therein are sealed with a hydrocarbon gas mixed with air or oxygen. The sample is permitted to stand for a period usually in excess of about two hours and preferably from five to fifteen hours and changes in pressure determined periodically by a manometer. Additionally, the residual gas in the sample may be analyzed.

This method has its defects in that there are a number of uncontrolled variables including the amount of moisture and the amount of nutrient in each sample. One sample may be from a wet area and one from a dry area. Naturally, the moisture in the wet sample will tend to encourage the growth of microorganisms and the consumption of gas. Similar variations may be found in the nutrient content. Such variables are important factors and may vary to an extent that a dry sample containing little nutrient and a large number of microorganisms may consume only a small amount of gas while a wet sample containing a relatively large amount of nutrient and only a few microorganisms may consume a large quantity of gas. Accordingly, the final results may be exactly contrary to the facts.

In the present invention such variables are eliminated by the use of a relatively large amount of nutrient which amount compared to any moisture content of the sample and any nutrient content is so large that any variations in moisture or nutrient content are substantially "ironed out" and each sample virtually standardized. Furthermore, the "reservoir" of nutrient medium, as explained hereinafter, acts to dilute the reacting medium constantly. This keeps the reaction products in a dilute state so that those which are toxic do not harm the growing microorganisms. Additionally, any material change in pH is prevented. Thus, the only variable factor is the number of microorganisms which is admittedly variable.

In addition, the use of the nutrient insures that any microorganisms present will grow under optimum conditions and that a maximum growth will be obtained. This is important where only small numbers of microorganisms such as bacteria are present in the samples. Without such optimum conditions, the resultant growth may be substantially nil and the survey of no value.

A further defect in prior methods such as that disclosed in the above-mentioned Taggart patent, is that no effort is made to preserve the soil samples in their original condition until they can be tested. Actual tests as discussed hereinafter have shown that such soil samples can vary widely in gas-consuming characteristics between the time they are taken from the soil and the time they are tested unless they are preserved under selected and predetermined conditions.

The sampling procedure has been found to be important, it being necessary to obtain samples which are truly representative of the areas into which the ground under observation has been divided.

Samples may be secured from different depths below the surface, depending to some extent upon the season of the year and the moisture content of the soil. In any case, it is desirable to get sufficiently far beneath the surface to avoid surface variables such as farming, etc. that may change from day to day. It is preferred to secure samples at depths below six inches, preferably at depths of 24" or more, since under some circumstances the top 6" layer may be substantially sterile.

It is believed that the depth is governed principally by the limit to which the necessary quantity of $O_2$ can penetrate. In dry soil or in dry weather, $O_2$ will penetrate further than in wet soil or in wet weather. Probably, the optimum depth is that at which the hydrocarbon such as methane, if present, and the $O_2$ are in optimum balance as regards propagation of the microorganisms. It is desirable that in the case of any one area being prospected, the sampling depth be uniform.

In sampling, several procedures have been found satisfactory. In one such procedure, a so-called test station is set up and a line extended therethrough to a distance about 10' to 35', usually about 25', in each direction. Samples of approximately one quart of soil are taken at the center of the line and at each end thereof. Each sample is then screened by a U. S. standard sieve No. 18 to secure one quart of soil. One third pint of each sample is withdrawn and combined to provide a composite sample of one pint which is considered to come from the test station. It has been found expedient to space such test stations about 250 feet apart.

Investigations conducted thus far indicate that a minimum of three equal distance soil samples from a 50 ft. line is desirable for a soil sample that is truly representative of the average rate of reaction for that particular soil.

For example, in extracting the samples from the earth, holes from 10 to 14 inches deep are dug at three sites along a 50 foot line, one at the center of the station and one 25 feet from each site in the direction of the sampling line. In extracting the soil sample, care should be taken to insure that the side walls of the holes are clear of surface dirt and dirt from boring and that the sample is taken from the side wall, thus excluding the possibility of picking up dirt from the boring operation which will collect in the bottom of the hole.

Another method involves the setting up of square areas 100 ft. on a side in which case samples are taken from the corners of the square and from the center, the samples being screened and aliquot portions taken therefrom to obtain the desired composite sample.

Since sampling is a field operation and the remaining procedure is best handled in the laboratory, the samples are suitably packaged and maintained at a temperature at which the bacterial content is maintained substantially static until they can be further processed. A temperature of about 42° F. has been found suitable for this purpose. Under such reduced temperature, it has been found that the samples can be stored for as long as four to seven days without any appreciable change in gas consuming activity.

Without such preservation and with storage at ambient temperatures, it has been found that such samples are materially accelerated in activity. In some cases, the change in rate of reaction has been as high as 17%. In other cases, it has been found that on standing only one day, the time necessary for the sample to complete its activity has been reduced by two and one-half days, thus indicating a much higher degree of activity than the sample originally possessed. Thus, the rate of reaction which is desirable in comparing the activity of the several samples can be rendered meaningless.

The nutrient mediums or media used can be varied widely as is well known to the bacteriologist. Two such media which gave excellent results in the prospecting herein described were prepared as follows:

*Medium I*

| | Grams |
|---|---|
| $NH_4NO_3$ | 1.0 |
| $MgSO_4$ | 0.1 |
| $K_2HPO_4$ | 0.5 |
| $CaSO_4$ | 0.1 |

Above ingredients diluted to 1000 ml. with distilled water, proximate pH 7.5.

*Medium II*

|  | Grams |
|---|---|
| $NH_4Cl$ | 1.0 |
| $K_2HPO_4$ | 0.5 |
| $MgNH_4PO_4$ | 0.5 |
| $CaSO_4$ | 0.1 |

Above ingredients diluted to 1000 ml. with distilled water, proximate pH 7.5.

In preparing for the gas contact and determination of the activities of the samples, the different soil samples are mixed with the medium as in a Waring blendor or like mixer, and aliquots withdrawn by siphoning while agitation is continued. More specifically, the soil composites removed from cold storage are each weighed and the weight recorded. Those composites weighing in excess of the average weight of all composites are reduced to the average weight by pouring the composite onto paper, mixing and removing the excess soil. Each composite in an amount of about 350 to 400 grams is then placed in a Waring blendor or similar mixer, the medium added in an amount of about 700 ml. and the mixture stirred vigorously for about one minute. The speed of the mixer is then reduced slightly by means of a variable transformer to a rate above that at which layering or any minimal separation will occur and the pH checked. A pH in the range of 6 to 8, preferably about 7.5, is preferred and the mixture so adjusted if necessary.

A siphon tube is inserted approximately 2″ below the surface of the soil-medium mixture and vacuum applied to the siphon tube to start the siphoning action. When the flow has begun, the siphon tube is clamped shut, removed from the vacuum line and connected to a reactor as later described. The siphon tube is opened, permitting about 50 ml. of the mixture to flow into the reactor. If the soil-medium mixture is in a jellied phase or is too viscous to flow through the siphon tube, it may be removed with a pipette.

As an alternative method, although not preferred, the soil may be dry-mixed by a technique similar to the method described in Quantitative Analysis by E. G. Mahin (4th ed., McGraw-Hill Book Co., Inc., N. Y., 1932). In such case, aliquots in amounts between 10 and 35 grams, preferably about 25 grams, are used with the medium in each reactor. This method does not provide as good results as does the aforesaid wet-mix in the mixer prior to charging the reactor. It has been found better to use a portion of the entire mixture as an inoculum rather than a portion of the supernatant liquid which might be termed "soil extract."

It is to be understood that the sizes of the soil samples as well as the aliquots thereof charged to the reactors may vary depending upon the particular experimental conditions employed. However, up to the present time, samples and aliquots of the approximate sizes indicated above have been found most practical and productive of the best results.

The subsequent procedure which follows the mixing is for the purpose of determining the relative activities of the different soil samples. This is determined by placing each soil-medium sample in its reactor in contact with the preselected mixture of gases including a hydrocarbon and continuing the contact under incubating conditions until the reaction is completed. While methane is preferred as the hydrocarbon, higher gases such as ethane, propane, butane, etc. may be used. The time, usually measured in days, necessary to reach this phase is an indication of the relative activity of the sample.

Figure 4:
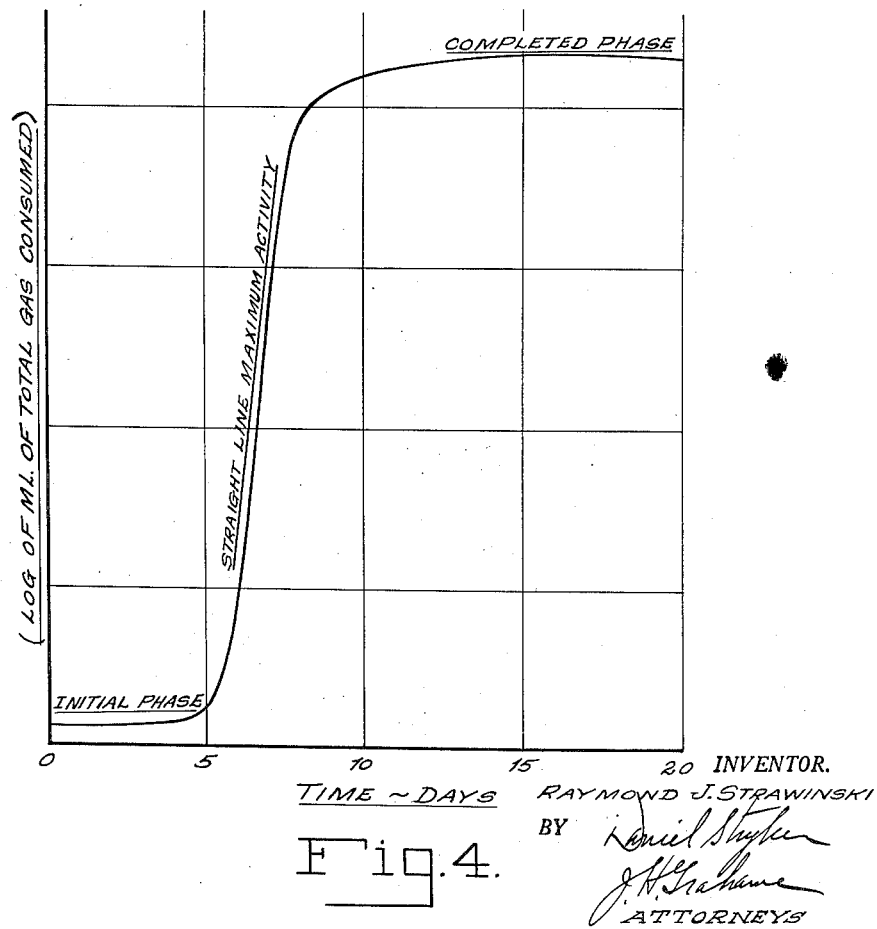
Fig. 4 is a graph illustrating the incubation cycle of a typical sample.

Referring to Fig. 4 which shows a curve plotted with time in days against the logarithm of the milliliters of overall gas volume change, the curve represents the decrease in overall gas volume in contact with the sample at given intervals of time. It will be noted first that the gas change is rather low in the initial phase. The curve rises relatively sharply through straight line portion of maximum activity until the completed phase is reached. The latter is caused by the exhaustion of the oxygen or hydrocarbon content of the gas mixture, depending upon the initial composition of the mixture. For convenience, the elapsed time necessary to reach the beginning of the completed phase can be used to rate the several samples as to activity.

Referring more specifically to the operations after the samples have been prepared and placed in the reactors, reference is made to Figs. 1, 2 and 3 showing a reactor 11 and a so-called reservoir 12 which for convenience are glass prescription bottles of about 250 ml. volume, the bottles being accurately calibrated as to the 50 ml. mark. Reactor 11 is closed by a rubber stopper having connections 13 and 14, the connection 14 extending below the 50 ml. mark. Reservoir bottle 12 is closed with a rubber stopper having connections 15 and 16, connection 15 extending down to the bottom of the bottle.

In filling a reactor, the reactor is first filled with the desired gas mixture preferably composed of $CO_2$, $O_2$, or air and $CH_4$ and at substantially atmospheric pressure for ease in handling. The exact composition of this mixture can be varied widely and is so selected that either the oxygen or the methane, preferably oxygen, will be exhausted first, thus indicating the beginning of the completed phase shown in Fig. 4. Preferably, the mixture is such that it is not explosive. A suitable mixture and one in which the oxygen is first exhausted is composed of 35% $O_2$, 60% $CH_4$ and 5% $CO_2$. The $CO_2$ is present primarily as a safety factor and its proportion can be varied to an extent such that it will not interfere with the reaction. The $O_2$ and $CH_4$ content can be varied within wide limits, compatible with safety.

With the reactor filled with the gas mixture, preferably under a slight positive pressure to insure against contamination, the release of pressure being indicative of a properly stoppered bottle, connection 14 is connected as part of a siphon to the mixture in the mixer, the latter being kept operating at a rate such that no separation of the soil-medium mixture therein takes place. An aliquot of the soil-medium sample is then siphoned into reactor 11 through connection 14 until 50 ml. of the sample is transferred to the reactor. It is desirable that the siphoning be continuous and that the solid particles in the sample be small enough so that there is no blocking of the siphon tube. When this operation is completed and connection 14 again closed, the reactor appears as shown in Fig. 2. Connection 13 is then closed and connection 14 connected to connection 15 of reservoir 12 which contains more of the same medium as originally mixed with the soil sample in the mixer. This arrangement is shown in Fig. 3.

With connection 13 closed and connection 16 of reservoir 12 open, the reactor contents are incubated at a temperature of about 25 to 35° C., preferably about 28 to 30° C. After standing for some time, it will be observed that some of the medium has passed from reservoir 12 into reactor 11 by reason of the consumption of gas in reactor 11 by microorganisms in the soil sample. This transfer of medium is permitted to continue until a liquid level is reached in reactor 11 indicative of a completion of the reaction or a beginning of the completed phase wherein either the oxygen or the methane has been exhausted. After incubation, the final pH has been found to be in the order of about 6.5 to 7.0.

In a reactor of the type shown herein, a liquid level of approximately 100 ml. has been found to indicate the desired completion of the reaction as accurate as is considered necessary. Hence, it has been found most advantageous to discontinue the incubation at that point and measure the elapsed days which indicate the relative activity of the sample. In the case of a more active sample, the number of days required to reach the 100 ml. mark or the completed phase is much less than the number of days required by a relatively inert sample.

It is to be understood that in the present case, the attainment of a liquid level of 100 ml. has been selected arbitrarily as a matter of convenience. However, it has been found close enough for the purposes of the present invention and has provided accurate and reproducible results. In other types of reactors with different types of medium and with different types of gas, this level may obviously vary.

The residual gas mixture in the reactor is then analyzed as by an infra-red spectrophotometer to determine the actual amount of hydrocarbon consumed in milliliters. If the gas composition was originally so selected that oxygen was the gas to be completely consumed, the actual amount of oxygen consumed would be determined. This measurement is not essential to an indication of the relative activity of the sample but is desirable to establish the normalcy of the reaction in the reactor and serves as a check upon the methane or oxygen consumption. Thus, any freak or abnormal samples that are not truly indicative of the area being prospected can be eliminated.

In the analysis, the slope of the straight line portions of the activity curves (Fig. 4) of the most active samples, that is, those reaching the beginning of the completed phase in the least number of days, constitute abnormally active samples. Samples which are slow in incubation and in which the straight line portion departs materially in slope from the slope of the more active samples have been found to be normal.

The most active samples as represented by those samples having substantially parallel straight line portions are then plotted on a diagram of the area being prospected as will be explained later in connection with Figs. 6 and 7.

As already indicated, all the samples may be carried to a completion of their reactions to determine the number of days required in each case and the relative activities of the samples. However, it has been found as accurate and more expedient to read the gas consumption of all samples on the day that the first samples complete their activity, i. e., attain the completed phase. In some cases as where one or two samples complete their activity on the same day, it may be advisable to wait one more day to determine whether the first samples were freaks. If on the second day a larger number of samples complete their reaction, the second day can then be taken as the first day. Then the gas consumption of all the samples regardless of their stage of reaction can be measured and plotted on a chart such as that shown in Fig. 5.

While the data thus obtained can be related directly to the area being prospected, it is preferable to subject the data first to a statistical analysis to smooth it out and obtain a better showing of the prospects for petroleum and gas.

Figure 5:
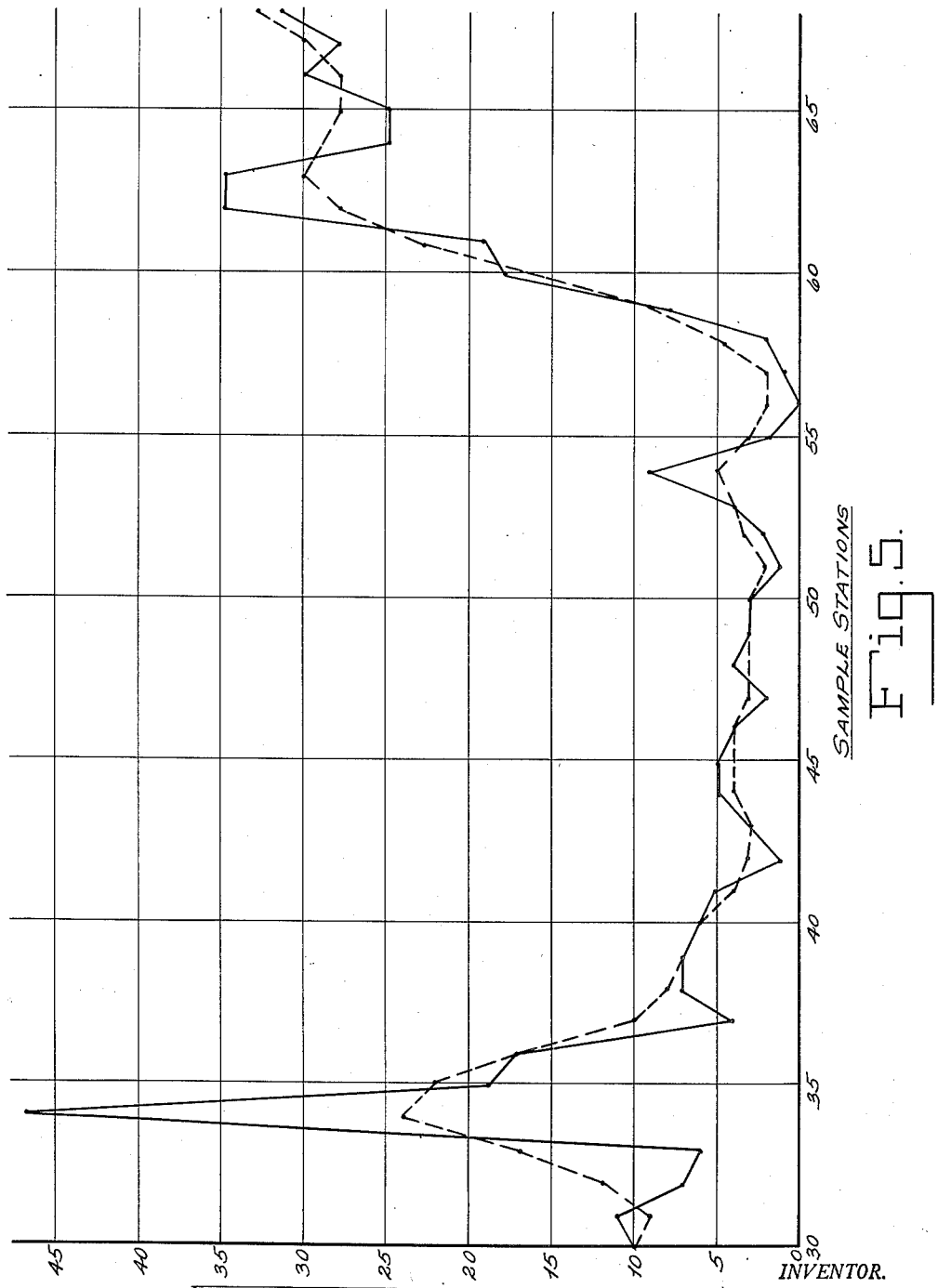
Fig. 5 is a graph illustrating a preferred method of analyzing the results prior to correlation with the area being prospected.
Figure 7:
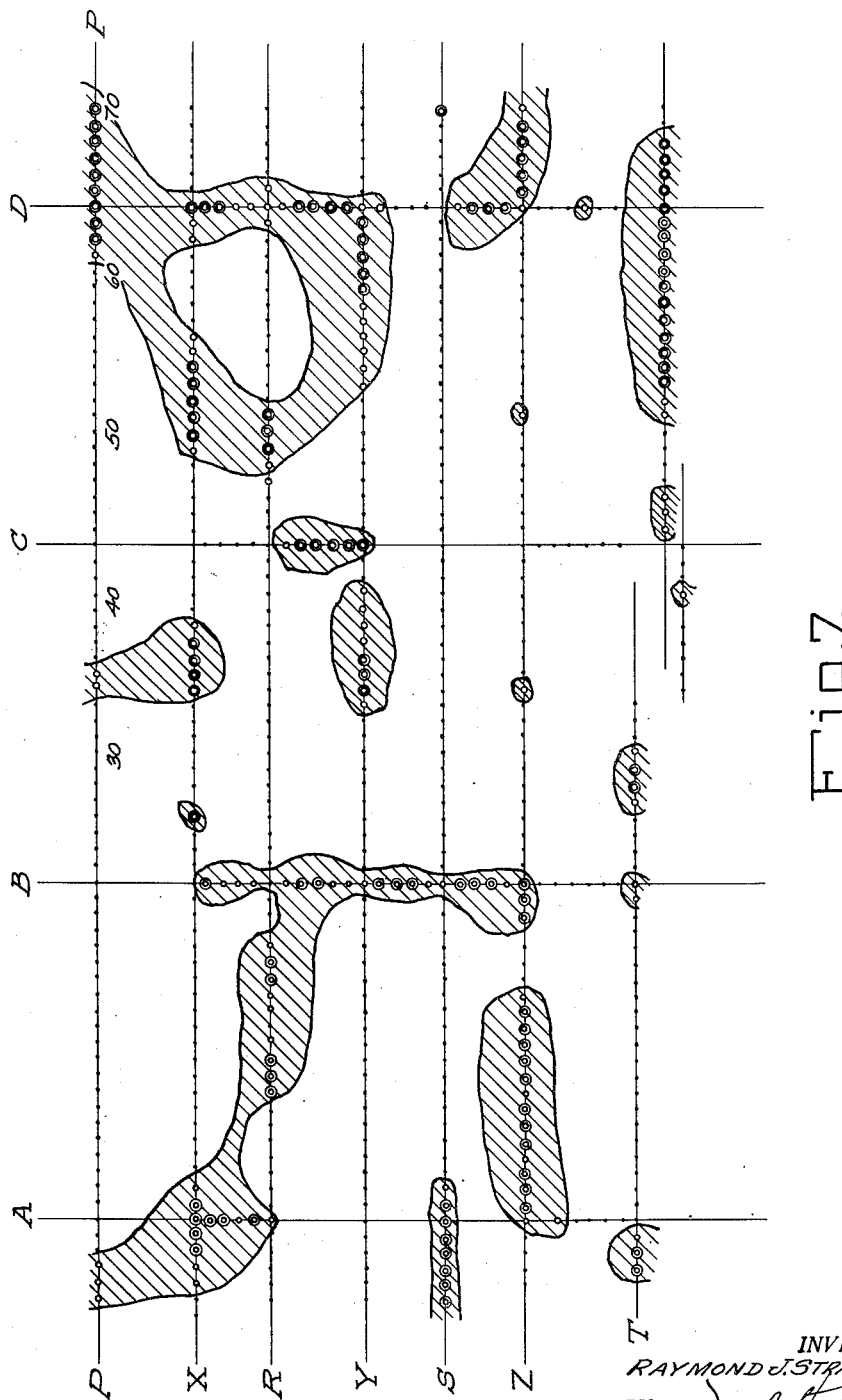
Fig. 7 illustrates the results of a second and more detailed survey over the same area as that shown in Fig. 5.

Referring to Fig. 5 which illustrates the gas level change in millimeters (1 mm. equals 2.2 ml.) from samples taken from the 30 mark to about the 70 mark on the P line of Fig. 7, the actual values are shown in solid lines. It will be noted that a saw-tooth effect is obtained which is to be considered normal when determining a biological activity. Nevertheless, it is evident from the profile that varying degrees of activity can be detected. In the present example, all soil samples found to produce over a 20.0 mm. (44.0 ml.) decrease in test gas volume were considered abnormally active. It is to be understood that in each situation, this value will be selected arbitrarily and can be easily determined by inspection and comparison of the various values obtained.

In order to average the variations noted which are probably due to natural and experimental causes, a convenient statistical method was adopted such as a 3-total, 3-total, moving average line. The construction of such a 3-total, 3-total moving average is graphically illustrated below:

3-total, 3-total, moving average:

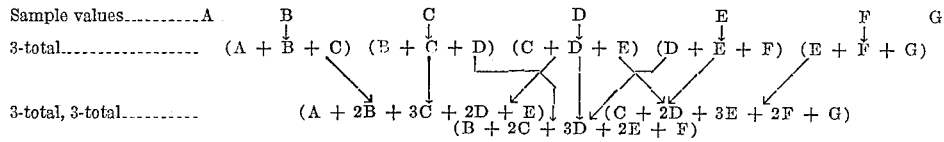

From the above, it will be seen that the station to which the mean value is plotted is given three times the weight of any other point, the two adjacent stations twice the weight, etc. In progressing across the station line, one station is dropped, two carried, and one added as shown above.

A 3-total, 3-total moving average was selected in this particular case because it introduced the least distortion of the actual data as well as evident from the broken line in Fig. 5. For instance, a 5-total, 5-total, moving average was found to flatten the weighted average line and was, therefore, not desirable.

Figure 6:
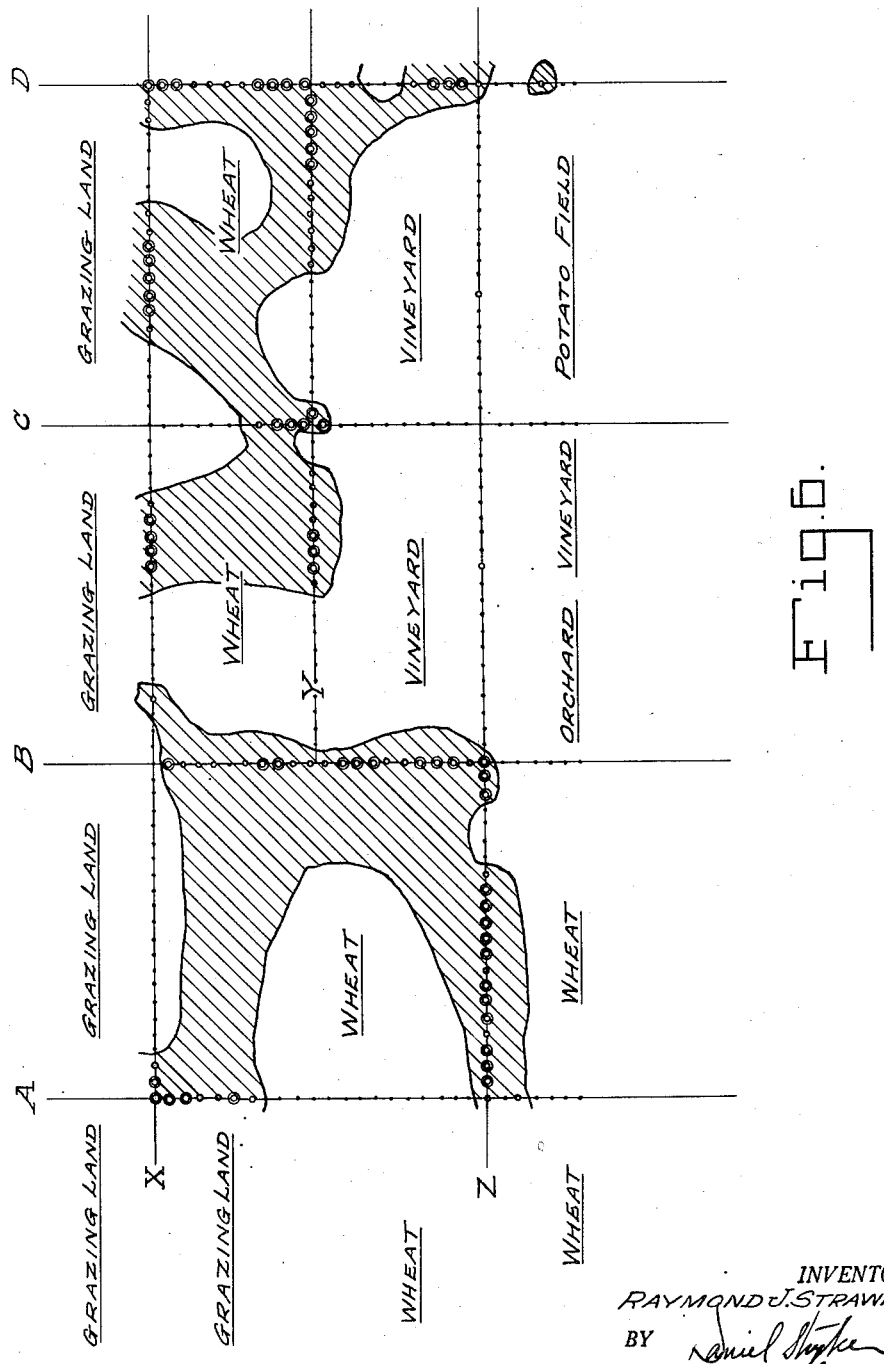
Fig. 6 illustrates the results of a survey conducted over a selected area of the earth's surface.

As an illustration of an example of practicing the invention, reference is made to the following descriptions of actual field operation illustrated in Figs. 6 and 7.

Referring to Fig. 6, test stations in a selected test area were staked out as indicated by the grid, the area in question including grazing land, an orchard, a vineyard, a grain field and a potato field. Some 281 composite soil samples were collected among approximately thirteen miles of test lines, the samples being prepared and incubated and the volume changes, rate of volume change and gas analyses being conducted as already described.

The results, after the aforesaid statistical analysis was applied thereto, are shown in Fig. 6, a simple dot indicating normal activity of the sample, a single circle indicating a gas volume change of 44 to 55 ml., and a double circle indicating a gas volume change in excess of 55 ml. Anything below a gas volume change of 44 ml. was considered to represent normal activity in this area.

In this survey the distance between stations was about 250 feet. As is evident from Fig. 6, abnormally active methane consuming areas tended toward grouping and gave some indication as to the location of the more active areas.

As a check upon the survey shown in Fig. 6, and also as a check upon the reproducibility of the data, a second and more detailed survey of the same area was made about five weeks later during which some 352 samples along about 16 miles of test lines at ¼ mile intervals between test lines were collected.

The results of this survey are shown in Fig. 7. It will be noted that the active areas indicated in Fig. 6 are again indicated active in Fig. 7 and that the extent of such areas has been more closely determined. In every instance, there was confirmation of the original findings despite the elapsed time interval and despite the fact that some of this land had been subject to cultivation.

It is interesting to note that in the sampling of another area wherein there was a known fault through which gases were escaping to the surface from an oil pool beneath, the data secured indicated a hitherto unknown extension of the fault.

From the foregoing, it is believed evident that the present invention provides a relatively economical and accurate method of prospecting which the presence and relative amounts of gases in the earth's surface indicative of petroleum, gas and other subterranean deposits can be readily determined.

While the invention has been described in connection with hydrocarbon gas in the earth's surface, it is to be understood that it is applicable to any type fluid capable of consumption by microorganisms.

I claim:
1. A method for prospecting for subterranean petroleum deposits characterized by the discharge of a hydrocarbon gas in the earth surface comprising the steps of collecting soil samples in the area being prospected, contacting aliquots of said soil samples under incubating conditions with a gas mixture comprising a gaseous aliphatic hydrocarbon and oxygen, said gas mixture being capable of utilization by hydrocarbon-consuming microorganisms whose presence is indicative of sub-surface petroleum deposits, effecting said contact in the presence of a substantial amount of added inorganic salt nutrient medium, said medium being selected so as to encourage optimum growth of said hydrocarbon-consuming microorganisms and employed in an amount sufficient to eliminate variables of moisture and nutrient content of said soil samples and to maintain the pH of said incubating mixture at a level conducive to optimum growth of said hydrocarbon-consuming microorganisms, determining the relative rates of hydrocarbon gas consumption in said gas mixture by said soil samples under said growth conditions and correlating said rates with the area being prospected.

2. A method according to claim 1 wherein said gas mixture comprises mainly methane and oxygen.

3. A method according to claim 1 wherein said gas mixture comprises about 35 per cent oxygen, 60 per cent methane and 5 per cent carbon dioxide.

4. A method according to claim 1 wherein approximately 7 ml. of said nutrient medium is added for every 3 to 4 grams of soil sample.

5. A process according to claim 1 in which said soil sample is mixed with said nutrient medium under conditions of agitation and a portion of the soil-nutrient mixture is withdrawn for contact with said gas mixture while said mixture is agitated sufficiently to prevent any substantial separation of substituents.

6. A process according to claim 1 in which said soil samples are maintained at a temperature of about 42° F. from the time they are collected until an aliquot thereof is contacted with said gas mixture.

RAYMOND J. STRAWINSKI.

References Cited in the file of this patent
UNITED STATES PATENTS

| Number | Name | Date |
|---|---|---|
| 2,294,425 | Sanderson | Sept. 1, 1942 |
| 2,349,472 | Taggart | May 23, 1944 |

OTHER REFERENCES

Porter, Bacterial Chemistry and Physiology, 1947, pages 660–661.